(12) United States Patent
Burmeister et al.

(10) Patent No.: US 7,827,686 B2
(45) Date of Patent: Nov. 9, 2010

(54) METHOD FOR THE MAINTENANCE OF GAS TURBINES

(75) Inventors: Rolf Burmeister, Rodewald (DE); Ferdinand Exler, Apelern (DE); Torsten Petrick, Wedemark (DE); Heinz-Juergen Siedow, Neustadt am Ruebenberge (DE); Lutz Winkler, Wunstorf (DE)

(73) Assignee: MTU Aero Engines GmbH, Munich (DE)

( * ) Notice: Subject to any disclaimer, the term of this patent is extended or adjusted under 35 U.S.C. 154(b) by 1337 days.

(21) Appl. No.: 10/554,471

(22) PCT Filed: Mar. 29, 2004

(86) PCT No.: PCT/DE2004/000651

§ 371 (c)(1),
(2), (4) Date: Jan. 12, 2006

(87) PCT Pub. No.: WO2004/097179

PCT Pub. Date: Nov. 11, 2004

(65) Prior Publication Data

US 2006/0272152 A1    Dec. 7, 2006

(30) Foreign Application Priority Data

Apr. 27, 2003  (DE) ............................... 103 19 015

(51) Int. Cl.
*B21D 39/03* (2006.01)
*B21K 25/00* (2006.01)
*B23P 6/00* (2006.01)
*B23P 19/00* (2006.01)
*B23P 19/04* (2006.01)
*B23P 23/00* (2006.01)

(52) U.S. Cl. ...................... 29/889.1; 29/889.2; 29/791; 29/564.1; 29/430; 29/402.08

(58) Field of Classification Search ................ 29/889.1, 29/564.1, 402.08, 281.6, 889.2, 890.01, 791, 29/430; 415/189
See application file for complete search history.

(56) References Cited

U.S. PATENT DOCUMENTS 4,611,464 A * 9/1986 Hetzer et al. ................... 60/792

(Continued)

FOREIGN PATENT DOCUMENTS

DE        690 15 461 T2     5/1995

(Continued)

OTHER PUBLICATIONS

J.W. Sawyer, P.E. Fellow, K. Hallberg, Turbomachinery Maintenance Handbook, 1980, Turbomachinery International Publications, Norwalk, USA, XP002293430; pp. 10-1 to 10-4.

(Continued)

*Primary Examiner*—David P Bryant
*Assistant Examiner*—Alexander P Taousakis
(74) *Attorney, Agent, or Firm*—Davidson, Davidson & Kappel, LLC

(57) ABSTRACT

A method for the maintenance of gas turbines is provided. According to the method, a gas turbine is dismantled and modules, structural components, or component parts of the aeroplane mechanism are subsequently inspected and/or repaired. Then, an aeroplane mechanism consisting of inspected and/or repaired or new modules, structural components or component parts is mounted. Dismantling and/or mounting is divided into at least two work steps. A work station is provided for each work step and the aeroplane mechanism, modules, structural components or component parts of the aeroplane mechanism are displaced by the work station provided for carrying out one work step.

7 Claims, 4 Drawing Sheets

U.S. PATENT DOCUMENTS

| | | | |
|---|---|---|---|
| 5,193,272 A | | 3/1993 | Wortmann et al. ......... 29/889.1 |
| 5,267,397 A | | 12/1993 | Wilcox ....................... 29/889.2 |
| 5,285,572 A | | 2/1994 | Rahti et al. ................ 29/889.1 |
| 5,575,145 A | * | 11/1996 | O'Neill et al. ................ 60/772 |
| 6,195,891 B1 | * | 3/2001 | Chen et al. ................ 29/889.1 |
| 6,324,749 B1 | * | 12/2001 | Katsuura et al. .............. 29/703 |
| 6,701,615 B2 | * | 3/2004 | Harding et al. ........... 29/889.1 |

FOREIGN PATENT DOCUMENTS

| | | |
|---|---|---|
| DE | 694 01 958 T2 | 6/1997 |
| EP | 0 493 685 | 7/1992 |
| EP | 0 404 038 B1 | 12/1994 |
| EP | 0 708 877 B1 | 3/1997 |

OTHER PUBLICATIONS

C. Bremer, Kompressor- und Turbinenschaufeln automatisch reparieren, Werkstatt und Betrieb, Carl Hanser Verlag, Muenchen, DE, vol. 129, No. 7/8, pp. 672-674, XP 000678763, ISSN 0043-2792—English Summary.

* cited by examiner

METHOD FOR THE MAINTENANCE OF GAS TURBINES

FIELD OF THE INVENTION

The present invention relates to a method for servicing gas turbines, i.e., aircraft engines or stationary gas turbines.

BACKGROUND

Maintenance, servicing and, in particular repair of gas turbines, in particular of aircraft engines, have a decisive role in determining the direct operating costs of an airplane. Thus, approximately 30% of the direct operating costs of an airplane is attributable to engines, approximately one-third of the operating costs relating to the engines being due to the maintenance of the aircraft engines. The maintenance costs of aircraft engines are therefore responsible for approximately 10% of the total direct operating costs of an airplane. The direct consequence of this is that efficient and cost-effective maintenance and servicing/repair of aircraft engines is of decisive importance for airlines. Similar reasoning applies also to stationary gas turbines.

To date, maintenance and servicing of gas turbines, in particular of aircraft engines, have been performed according to the workshop principle. According to the workshop principle, at least portions of the gas turbine, of the aircraft engine in particular, remain in one position, i.e., in one location. Necessary work materials, tools, and personnel are brought to the gas turbine, to the aircraft engine in particular, in a timely manner, so that disturbances are kept to a minimum, and a promised maintenance time is able to be observed.

However, maintenance or servicing of gas turbines, of aircraft engines in particular, according to the workshop principle has the disadvantage that maintenance does not follow a defined process structure. Instead, work on gas turbines, on aircraft engines in particular, is performed in almost any desired sequence, which results in disturbances and delays during servicing, in particular when a plurality of gas turbines or aircraft engines is serviced simultaneously. Therefore, maintenance according to the workshop principle has the disadvantage that not only is there no clear process structure, but also long times are needed for servicing and maintenance. This has a negative effect on efficiency when servicing gas turbines, in particular aircraft engines.

SUMMARY OF THE INVENTION

On this basis, the object of the present invention is to provide a novel method for servicing gas turbines, in particular aircraft engines.

Gas turbines, in particular aircraft engines, are disassembled for servicing, repairs in particular. Subsequently modules and/or subassemblies and/or individual parts of the gas turbines, in particular of aircraft engines, are inspected and/or repaired. A gas turbine, in particular an aircraft engine, is then assembled from inspected and/or repaired and/or new modules and/or subassemblies and/or individual parts. According to the present invention, assembly and/or disassembly is divided into at least two work steps, a work station being provided for each work step, and the gas turbines, in particular aircraft engines, and/or modules and/or subassemblies and/or individual parts of the gas turbine, in particular of the aircraft engine, being moved through the individual work stations, each work station being provided for the purpose of executing a particular work step.

The method according to the present invention for servicing gas turbines, in particular aircraft engines, allows maintenance or servicing of gas turbines, in particular aircraft engines, to be performed according to an assembly line principle. It is a basic finding of the present invention that the assembly line principle is also suitable for maintenance work or servicing work on gas turbines, in particular aircraft engines. The present invention overcomes the prejudice that the assembly line principle is only suitable for the manufacture of new gas turbines, in particular aircraft engines, but not for their servicing or maintenance. This prejudice from the related art is based on the fact that when manufacturing new turbines a new item is produced from individual parts or raw materials having a defined characteristic, whereas during servicing or maintenance an article having unknown characteristics is disassembled, inspected, repaired, and subsequently assembled. Unlike new production, the required work steps when maintaining or servicing gas turbines, in particular aircraft engines, are not always the same, but always depend on the specific condition of the gas turbine or aircraft engine to be serviced. However, the present invention shows that an assembly line principle may be successfully used even in the case of servicing gas turbines, in particular aircraft engines. The method according to the present invention makes high efficiency and short service times possible when servicing gas turbines, in particular aircraft engines. The method according to the present invention is very flexible.

According to an advantageous refinement of the present invention, the gas turbine, in particular the aircraft engine, and/or modules and/or subassemblies and/or individual parts thereof is/are moved discontinuously, namely stepwise at a certain pace, through the work stations, each work step at the particular work stations being adapted to the pace.

The disassembly and/or assembly is preferably broken down into a plurality of main work steps and at least one secondary work step associated with the main work step, the secondary work steps being performed after the main work step during disassembly and before the main work step during assembly. A main work station is provided for each main work step and a secondary work station is provided for each secondary work step. The gas turbine, i.e., the aircraft engine, and/or modules and/or subassemblies and/or individual parts are moved through the main work stations and secondary work stations in a stepwise manner. The time at the secondary work stations is preferably shorter than the time at the main work stations. Modules and/or subassemblies and/or individual parts of another gas turbine, i.e., another aircraft engine, may thus be included in the method.

BRIEF DESCRIPTION OF THE DRAWINGS

An exemplary embodiment of the invention is described on the basis of the drawing without being restricted thereto. In the Figures.

DETAILED DESCRIPTION

Figure 1:
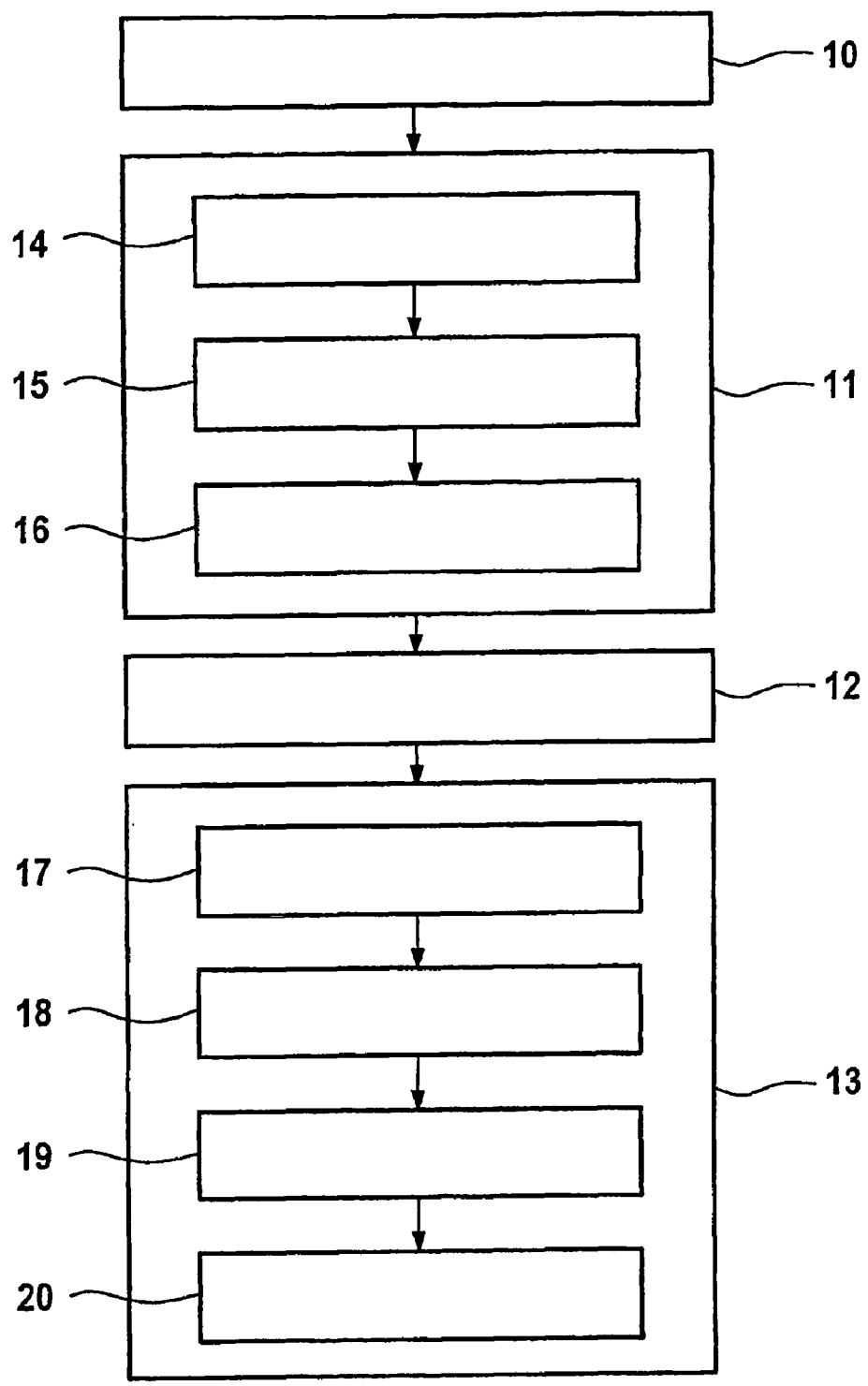
FIG. 1 shows a signal flow chart to illustrate the method according to the present invention, including the disassembly of an aircraft engine, repair of the modules and/or subassemblies and/or individual parts of an aircraft engine, and assembly of the aircraft engine.
Figure 2:
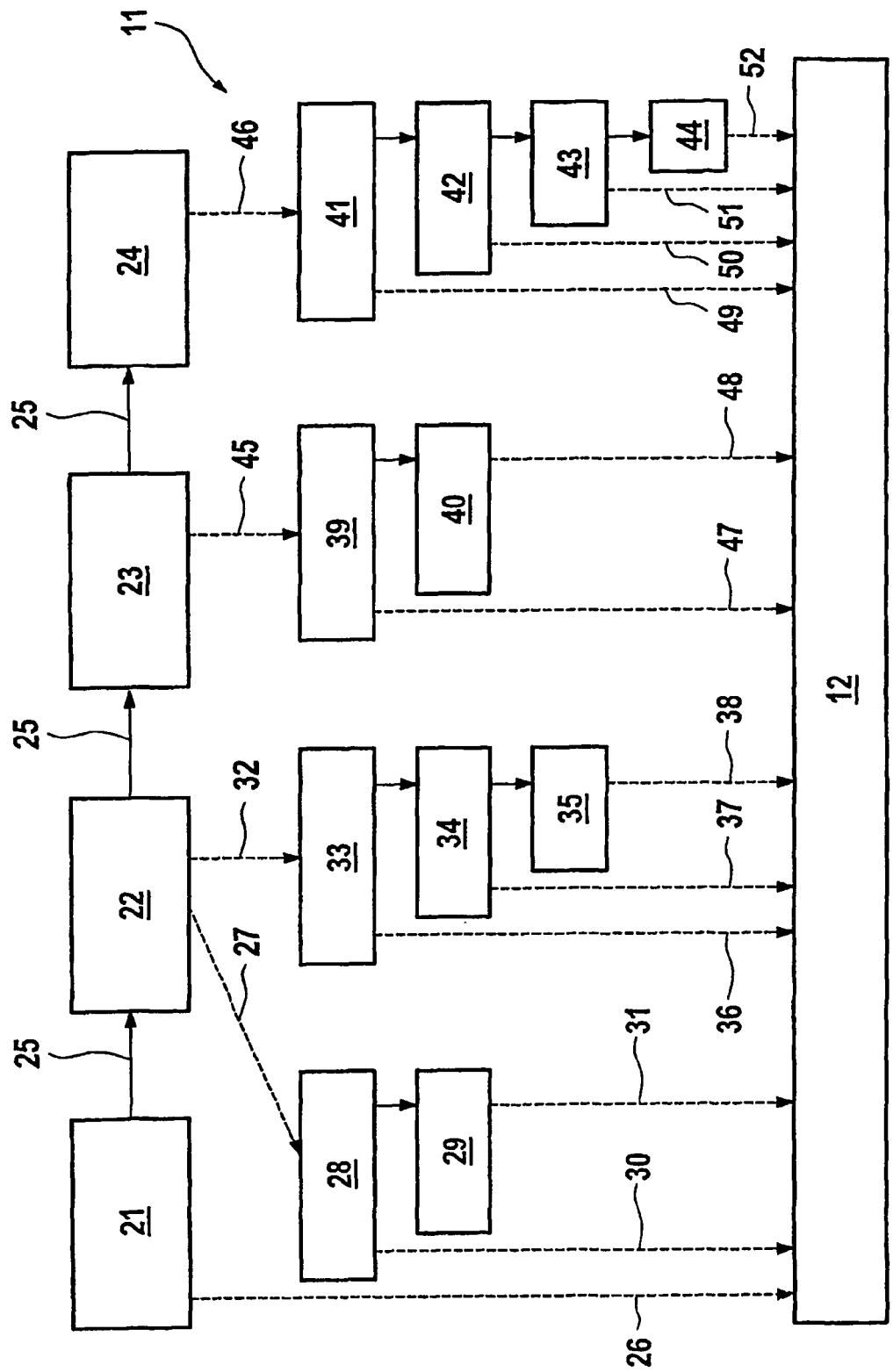
FIG. 2 shows a detailed signal flow chart of a block of the signal flow chart of FIG. 1 to illustrate the disassembly of the aircraft engine.
Figure 3:
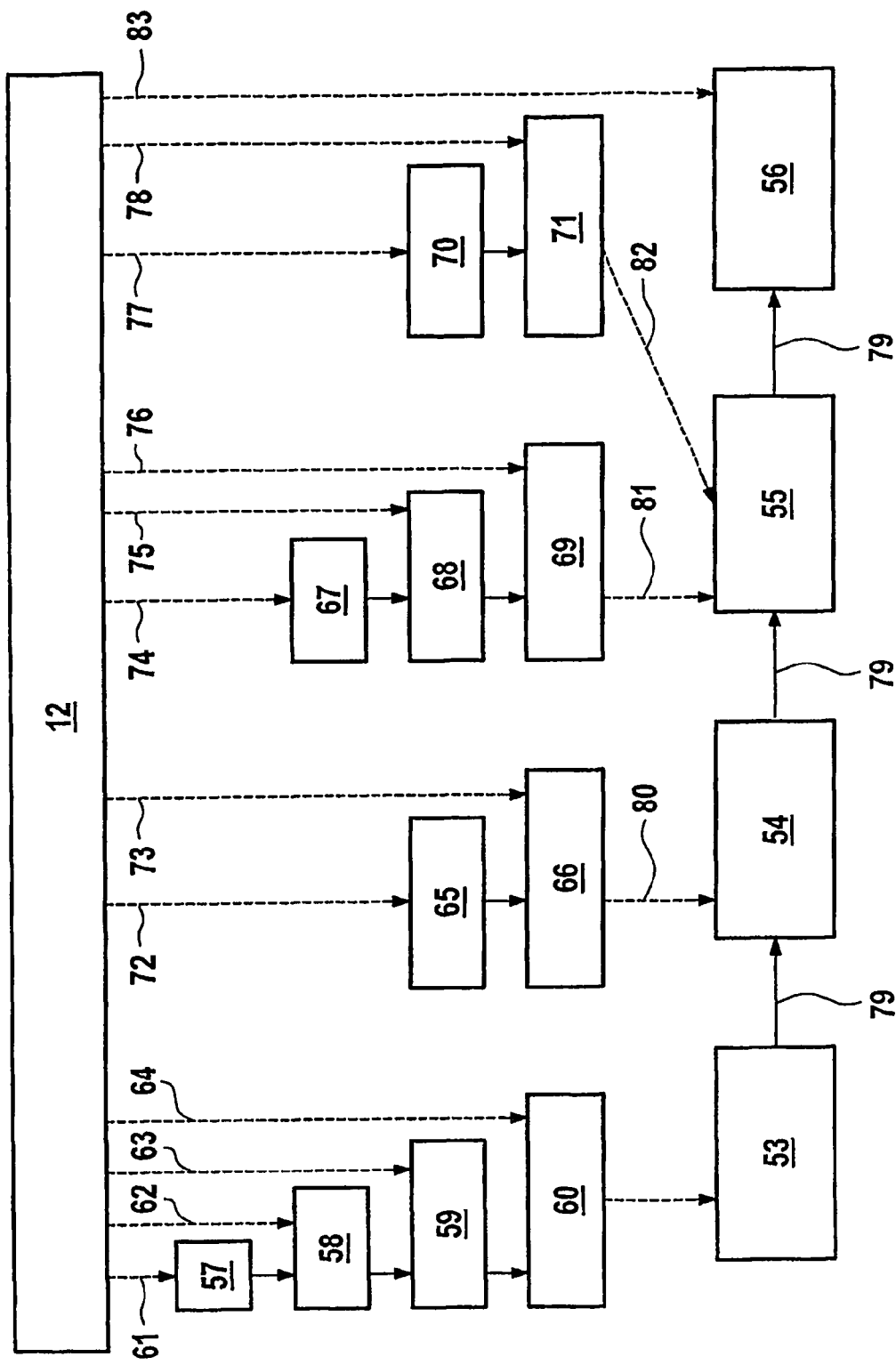
FIG. 3 shows a detailed signal flow chart of a block of the signal flow chart of FIG. 1 to illustrate the assembly of the aircraft engine.
Figure 4:
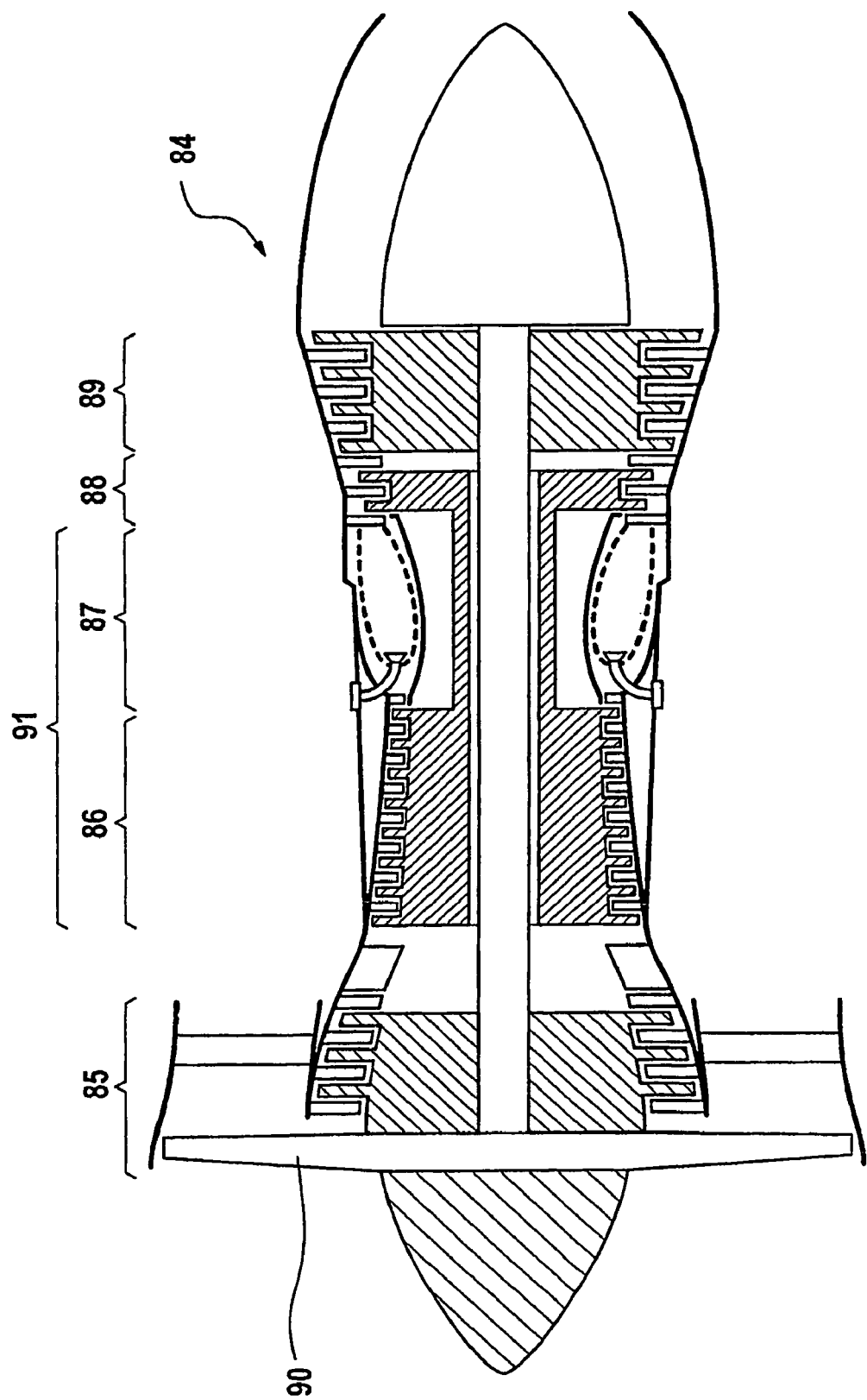
FIG. 4 shows a highly simplified cross section of an aircraft engine to be serviced.

FIG. 1 shows a highly simplified signal flow chart, i.e., block diagram, of the method according to the present invention. Thus, FIG. 1 shows the cleaning, disassembly, repair, and subsequent assembly of aircraft engines. FIG. 2 shows a detailed block diagram of the disassembly of an aircraft engine; FIG. 3 shows a detailed block diagram of the assembly of an aircraft engine. FIG. 4 shows a highly simplified illustration of an aircraft engine to be serviced and its modules.

According to FIG. 1, an aircraft engine to be serviced is cleaned in a first step 10. After cleaning, the aircraft engine is disassembled into modules and/or subassemblies and/or individual parts in a second step 11. Disassembly of the aircraft engine according to step 11 is followed by a third step 12, in which the modules and/or subassemblies and/or individual parts of the aircraft engine are inspected and/or repaired. If the inspection in step 12 shows that a module and/or a subassembly and/or an individual part of the aircraft engine is undamaged, repair is not necessary. Following inspection and, if required, repair according to step 12, an aircraft engine is assembled in a fourth step 13. The aircraft engine is assembled from inspected and/or repaired and/or new modules or subassemblies or individual parts. If the inspection in step 12 shows that a module, subassembly, or individual part of the aircraft engine is no longer able to be repaired, it is replaced by a new or new value module, subassembly, or individual part.

The present invention concerns mainly the disassembly and assembly of the aircraft engine according to steps 11 and 13.

According to the present invention, both disassembly according to step 11 and assembly according to step 13 are divided into at least two work steps. A work station is provided for each work step. The aircraft engine and/or a module and/or a subassembly and/or an individual part of the aircraft engine is/are moved through the individual work stations to perform a work step thereon at the work station provided for this purpose. According to the present invention, the aircraft engine does not remain at one place or in one position, but rather it is moved through different work stations. The assembly line principle is thus introduced for the first time according to the present invention for the maintenance and servicing of aircraft engines.

FIG. 1 illustrates the division of the disassembly according to step 11 and the assembly according to step 13 into different work steps. Thus, according to FIG. 1, the disassembly of the aircraft engine is preferably divided into three work steps 14, 15, and 16, whereas the assembly of the aircraft engine is preferably divided into four work steps 17, 18, 19, and 20. Of course, a smaller or greater number of work steps may also be provided for both the disassembly according to step 11 and the assembly according to step 13. For the assembly according to step 13, however, preferably one more work step is always provided than for the disassembly according to step 11, since the aircraft engine assembled during assembly must be adjusted after assembly via adjustment work on the aircraft engine.

It should be noted regarding FIG. 1 that a work station is provided for each of the work steps. According to the present invention, the aircraft engine or modules, subassemblies, or individual parts of the same are moved through the different work stations both for disassembly according to step 11 and for assembly according to step 13. The work stations are adapted to the corresponding work step. The required tools and, if necessary, work materials needed for the particular work step 14 through 20 are provided at each work station. Thus, each work station is adapted to the special work step to be performed at the particular work station.

An embodiment of the method according to the present invention in which the aircraft engine and/or the modules and/or subassemblies and/or individual parts of the aircraft engine is/are moved discontinuously through work stations 14 through 20 is preferable. Discontinuous movement is understood to mean that the movement through the individual work stations takes place in a stepwise manner. The length of a step is matched to the work steps at the particular work stations. The length of a step is thus determined so that sufficient time is reserved for each work station, making it possible for the work step to be reliably performed at the particular work station. Since the step for each of the consecutive work stations through which the aircraft engine is moved during disassembly and assembly is of the same length, the work steps required for assembly and disassembly are divided among the work stations in such a way that no timing problems occur during assembly and disassembly.

Of course, it is possible to service different types of engines using the method according to the present invention. The work steps to be performed at the work stations are matched to the different engine types so as to make it possible for the timing to be observed for each engine. The engine types are standard engines and are known to those skilled in the art.

FIG. 2 illustrates the disassembly of an aircraft engine in greater detail. Thus, according to FIG. 2, disassembly is divided into a plurality of main work steps and a plurality of secondary work steps. A main work station is provided for each main work step and a secondary work station is provided for each secondary work step. Thus, a total of four main work stations 21, 22, 23, and 24 are provided in the exemplary embodiment of FIG. 2. Main work stations 21 through 24 are arranged consecutively, so that an aircraft engine to be serviced, i.e., to be disassembled, is moved from first main work station 21 successively through subsequent work stations 22, 23, and 24. The movement of the aircraft engine to be disassembled through main work stations 21 through 24 is illustrated by arrow 25. The aircraft engine to be disassembled moves through main work stations 21 through 24 with the help of a conveying device, which moves the aircraft engine to be disassembled discontinuously, i.e. stepwise, through main work stations 21 through 24.

The aircraft engine cleaned in step 10 (see FIG. 1) is positioned and inspected as a unit at first main work station 21. The entire aircraft engine is inspected at first main work station 21 using a boroscope. In this boroscopic inspection of the aircraft engine at first main work station 21, the condition of the aircraft engine is determined and documented. Any necessary repair work on the aircraft engine may be estimated already at this point. A main fan wheel module is also removed from the aircraft engine at first main work station 21. The removed main fan wheel module is then conveyed, as indicated by arrow 26, for further inspection and, if necessary, repair according to step 12. Boroscopic inspection and status documentation of the cleaned aircraft engine and the disassembly of the main fan wheel module at first main work station 21 determine a first main work step.

The aircraft engine from which the main fan wheel module has been removed is moved according to arrow 25 to second main work station 22, where it undergoes a second main work step. In second main work step 22, a low-pressure turbine module and a high-pressure turbine module are removed from the engine.

After reaching the next step, the aircraft engine which has been appropriately further disassembled is moved according to arrow 25 to third main work station 23, where it is subjected to a third main work step. In the third main work step, a high-pressure compressor module is removed from the aircraft engine, the high-pressure compressor module being composed of the actual high-pressure compressor and the combustion chamber. After removing the high-pressure compressor module, only the fan case module remains. It is then preferably moved according to arrow 25 to a fourth main work station 24, no further major work step being performed, however, at fourth main work station 24.

It should be pointed out again at this point that the aircraft engine is moved step by step through the individual main work stations 21 through 24. Main work steps are performed in the first three main work stations 21 through 23. Main work stations 21 through 23 are adapted to the main work steps to be executed at the main work stations, i.e., the required tools are ready for use.

According to FIG. 2, secondary work stations are situated downstream from main work stations 22, 23, and 24. At the secondary work stations the modules removed from the aircraft engine—i.e., the low-pressure turbine module, the high-pressure turbine module, the high-pressure compressor module, and the fan case module in the exemplary embodiment shown—undergo further disassembly into subassemblies or individual parts.

Thus, according to arrow 27 in FIG. 2, the low-pressure turbine module removed during the second main work step at second main work station 22 is taken to a first secondary work station 28. In the exemplary embodiment shown, a second secondary work station 29 is situated downstream from first secondary work station 28. The low-pressure turbine module is moved stepwise through the two secondary work stations 28 and 29, and at these secondary work stations 28, 29 secondary work steps are performed for further disassembly of the low-pressure turbine module. The subassemblies or individual parts removed from the low-pressure turbine module during the secondary work steps at secondary work stations 28 and 29 are then subjected to further inspection and/or repair in step 12 according to arrows 30, 31.

As in the case of the low-pressure turbine module, the high-pressure turbine module removed at second main work station 22 is conveyed to a first secondary work station 33 according to arrow 32. Two further secondary work stations 34 and 35 are situated downstream from first secondary work station 33 in the exemplary embodiment shown. To disassemble the high-pressure turbine module, it is moved in a stepwise manner through three consecutive secondary work stations 33, 34, and 35 and disassembled into subassemblies or individual parts in appropriate secondary work steps. These are then conveyed for further inspection and/or repair in step 12 according to arrows 36, 37, and 38.

The procedure is similar for further disassembly of the high-pressure compressor module and the fan case module. Thus, a total of two secondary work stations 39 and 40 are situated downstream from third main work station 23. In the exemplary embodiment shown, a total of four secondary work stations 41, 42, 43, and 44 are situated downstream from fourth main work station 24. The high-pressure compressor module and the fan case module are moved through secondary work stations 39, 40 and 41, 44 for further disassembly.

Thus, the high-pressure compressor module, including the actual high-pressure compressor and the combustion chamber, disassembled in the third main work step, i.e., at third main work station 23, is conveyed to secondary work station 39 according to arrow 45, and the fan case module is conveyed to secondary work station 41 according to arrow 46. According to the number of available secondary work stations, both the high-pressure compressor module and the fan case module are moved through the appropriate secondary work stations and disassembled into the respective subassemblies or individual parts. These subassemblies or individual parts are then conveyed and subjected to further inspection and/or repair in step 12 according to arrows 47, 48, 49, 50, 51, and 52.

Thus, according to the above-described structure of the method according to the present invention, the aircraft engine is disassembled into basic modules at the main work stations. For this purpose, the aircraft engine is moved stepwise through the main work stations which are adapted to the corresponding main work steps. The modules of the aircraft engine disassembled stepwise, less the main fan wheel module, are removed from the corresponding main work stations 22, 23, 24 and conveyed to the downstream secondary work stations, where they are disassembled into subassemblies and/or individual parts. For this purpose, the modules are moved through the particular secondary work stations. The secondary work stations are also adapted to the secondary work steps to be performed at the secondary work stations. The number of main work stations and secondary work stations shown is only exemplary in nature. The number of main work stations and secondary work stations may, of course, vary.

The aircraft engine is moved through the main work stations and the removed modules are moved through the particular secondary work stations preferably with the aid of an appropriate conveying means, i.e., a conveying device.

The time in which the aircraft engine is moved through main work stations 21 through 24 is preferably longer than the time at at least some secondary work stations. Thus, an embodiment, in which the time at main work stations 21 through 24, which are used for disassembling the aircraft engine into modules, is equal to the time at secondary stations 41 through 44, which are used for further disassembly of the fan case module into subassemblies and/or individual parts, is particularly advantageous. However, the time at secondary work stations 28 and 29 and secondary work stations 33 through 35, as well as secondary work stations 39 and 40, which are used for further disassembly of the low-pressure turbine module, the high-pressure turbine module, and the high-pressure compressor module, is shorter than the time at main work stations 21 through 24.

In the embodiment shown, the time at main work stations 21 through 24 and the time at secondary work stations 41 through 44 is sixteen hours. The time at the remaining secondary work stations 28, 29, 33 through 35, and 39, 40 is twelve hours. This makes it possible to include modules or subassemblies or individual parts of another aircraft engine, which is not delivered complete for disassembly, in the disassembly process. Due to the above-described selection of times, only one intermediate storage is needed for a module.

After the complete aircraft engine and the included modules of an aircraft engine as shown in FIG. 2 have been disassembled into modules or subassemblies or individual parts, the modules or subassemblies or individual parts of the aircraft engine are further inspected and/or repaired in step 12. If further inspection shows that no repair is necessary, the corresponding module or subassembly or individual part may be conveyed for assembly or conveyed to an upstream storage for assembly. If the inspection in step 12 indicates that repair is no longer possible or economical due to the damage, the module or subassembly or individual part is replaced by an appropriate new part. Other modules or subassemblies or individual parts are subjected to repair, which is not described in detail here.

Repair procedures for repairing engine modules or engine components or individual engine parts are known from the related art.

After inspection and/or repair in step 12, the aircraft engine is assembled in step 13. FIG. 3 shows a detailed block diagram for the assembly of the aircraft engine.

Thus, according to FIG. 3, the aircraft engine is assembled, as it was disassembled, in a plurality of main work steps and in a plurality of secondary work steps. Therefore, a total of four main work stations 53, 54, 55, and 56 are provided for assembling an aircraft engine from inspected and/or repaired and/or new individual parts and/or subassemblies and/or modules. Main work steps are executed in main work stations 53 through 56 and the aircraft engine is assembled from modules. When assembling the aircraft engine, it is moved stepwise through main work stations 53 through 56 as a function of its module-based assembly. Secondary work stations are again associated with first three main work stations 53, 54, and 55 according to FIG. 3, the secondary work stations being upstream from the corresponding main work stations during the assembly, rather than downstream as during the disassembly of the aircraft engine (see FIG. 2). Modules of the aircraft engine are assembled from subassemblies or individual parts at the secondary work stations, the corresponding modules being moved through consecutive secondary work stations as a function of the status of this assembly.

Thus, a total of four secondary work stations 57, 58, 59, and 60 are provided for the assembly of the fan case module as shown in FIG. 3. To assemble the fan case module, the fan case module is moved stepwise through secondary work stations 57 through 60 as a function of the assembly status of the fan case module. Repaired and/or inspected subassemblies or individual parts of the fan case module or new value individual parts are conveyed to secondary work stations 57 through 60 according to arrows 61, 62, 63, and 64 to enable the particular secondary work steps for assembling the fan case module to be performed at the appropriate secondary work stations. Similarly, secondary work stations 65 and 66 are situated upstream from second main work station 54 and secondary work stations 67, 68, 69 and 70, 71 are situated upstream from third main work station 55. Secondary work stations 65, 66, situated upstream from second main work station 54, are used for stepwise assembly of the high-pressure compressor module, including the high-pressure compressor and the combustion chamber; secondary work stations 67, 68, and 69 are used for stepwise assembly of the high-pressure turbine module, and secondary work stations 70 and 71 are used for stepwise assembly of the low-pressure turbine module. Repaired and/or inspected and/or new value subassemblies or individual parts are again conveyed to the corresponding secondary work stations according to arrows 72, 73, 74, 75, 76, 77, and 78 for use in the corresponding secondary work steps. The secondary work stations are adapted to the secondary work steps to be performed at the secondary work stations, i.e., the tools and materials needed for the particular secondary work step are ready for use at each of the secondary work stations.

A fan case module assembled at secondary work stations 57 through 60 is positioned at first main work station 53 in a first main work step, and then moved to second main work station 54 according to arrow 79. Then a high-pressure compressor module assembled at secondary work stations 65 and 66 is conveyed, according to arrow 80, to the fan case module positioned at second main work station 54, and the fan case module and the high-pressure compressor module are assembled in the second main work step at second main work station 54. This partially assembled unit composed of the fan case module and the high-pressure compressor module is then moved to third main work station 55 according to arrow 79. In the third main work step, which is performed at third main work station 55, an assembled high-pressure turbine module is moved according to arrow 81, and an assembled low-pressure turbine module is moved according to arrow 82, to third main work station 55, and assembled there. The unit assembled from the fan case module, the high-pressure compressor module, the low-pressure turbine module, and the high-pressure turbine module is then moved, according to arrow 79, to fourth main work station 56. A fourth work step is performed in fourth main work station 56. In the fourth main work step, an assembled main fan wheel module is moved to fourth main work station 56 according to arrow 83 and is assembled there, and adjustment work is performed on the aircraft engine to adjust the assembled aircraft engine.

The aircraft engine is moved through the secondary work stations and the main work stations stepwise for both disassembly and assembly. Thus, the time in which the aircraft engine is moved through main work stations 53 through 56 for assembly is also sixteen hours long. The time for assembly of the fan case module at secondary work stations 57 through 60 is also sixteen hours long. The time at the remaining secondary work stations 65, 66; 67 through 69, and 70, 71 is in turn preferably twelve hours long, i.e., shorter than the time at the main work stations. This again makes it possible to insert other modules into the assembly process. The entire repair process is therefore open. The most diverse engine types may be serviced. It is also possible to insert only individual modules of other engines into the maintenance process, i.e., the method according to the present invention.

FIG. 4 illustrates the modules and subassemblies, repeatedly mentioned above, of an aircraft engine 84 to be serviced. Aircraft engine 84 according to FIG. 4 has a main fan wheel module 90, a fan case module 85, a low-pressure turbine module 89, a high-pressure turbine module 88, and a high-pressure compressor module 91, which includes the high-pressure compressor 86 and combustion chamber 87 subassemblies.

With the aid of the present invention, the use an assembly line principle in servicing or maintaining aircraft engines is proposed for the first time. Thus the prejudice known from the related art that an assembly line process is not suitable for maintenance or repair work is overcome.

What is claimed is:

1. A method for servicing gas turbines comprises the steps of
  a) disassembling a gas turbine into modules and/or subassemblies and/or individual parts of the gas turbine;
  b) inspecting and/or repairing and/or replacing the modules and/or subassemblies and/or individual parts of the gas turbine;
  c) reassembling the gas turbine from the inspected and/or repaired and/or new modules and/or subassemblies;
  wherein at least one of steps a) and c) is divided into at least two work steps, wherein a work station is provided for performing each work step, and wherein at least one of steps a) and c) further comprise
  moving the gas turbine and/or modules and/or subassemblies and/or individual parts thereof through the work stations; and
  at each work station, performing a corresponding work step on the gas turbine and/or modules and/or subassemblies and/or individual parts;
  wherein the at least two work steps includes a plurality of main work steps and a plurality of secondary work steps associated with at least one of the main work steps, and wherein the step of performing includes performing the secondary work steps associated with a main work step downstream from the associated main work step for disassembly step a), and upstream from the associated main work step for assembly step c);

wherein the disassembling step a) is divided into three main work steps, the gas turbine being moved consecutively through the consecutive main work stations and disassembled into its modules; and wherein the gas turbine is an aircraft engine and the aircraft engine is inspected as one unit, and wherein the disassembling step a) includes A1) removing a main fan wheel module in a first main work step at a first main work station;

A2) moving the aircraft engine with the main fan wheel module removed to a second main work station, A3) removing a low-pressure turbine module and a high-pressure turbine module in a second main work step at the second main work station;

A4) moving the disassembled aircraft engine from step A3) to a third main work station, A5) removing a high-pressure compressor module in a third main work step at the third main work station, wherein a fan case module remains after step A5).

2. The method as recited in claim 1, wherein the disassembling step a) includes, prior to step A1), cleaning the aircraft engine, and after step A1) immediately conveying the main fan wheel module for further inspection and/or repair.

3. The method as recited in claim 1, further comprising

A6) conveying the low-pressure turbine module and high-pressure turbine module removed in the second main work step to secondary work stations situated downstream from the second main work station, wherein both the low-pressure turbine module and the high-pressure turbine module are moved through appropriately adapted consecutive secondary work stations and disassembled into subassemblies and/or individual parts, A7) conveying the disassembled subassemblies and/or individual parts of step A6) for further inspection and/or repair.

4. The method as recited in claim 1, wherein the dissembling step a) further comprises:

A6) conveying the high-pressure compressor module removed in the third main work step to secondary work stations situated downstream from the third main work station, the high-pressure compressor module being moved through appropriately adapted consecutive secondary work stations and disassembled into subassemblies and/or individual parts at said secondary work stations; and A7) conveying the subassemblies and/or individual parts from step A6) for further inspection and/or repair.

5. The method as recited in claim 1, wherein the dissembling step a) further comprises:

A6) conveying the fan case module to a fourth main work station;

A7) conveying the fan case module from the fourth main work station to secondary work stations situated downstream from the fourth main work station, the fan case module being moved through appropriately adapted consecutive secondary work stations and disassembled into subassemblies and/or individual parts at said secondary work stations, A8) conveying the subassemblies and/or individual parts of step A7 for further inspection and/or repair.

6. A method for servicing gas turbines comprises the steps of a) disassembling a gas turbine into modules and/or subassemblies and/or individual parts of the gas turbine;

b) inspecting and/or repairing and/or replacing the modules and/or subassemblies and/or individual parts of the gas turbine;

c) reassembling the gas turbine from the inspected and/or repaired and/or new modules and/or subassemblies;

wherein at least one of steps a) and c) is divided into at least two work steps, wherein a work station is provided for performing each work step, and wherein at least one of steps a) and c) further comprise moving the gas turbine and/or modules and/or subassemblies and/or individual parts thereof through the work stations; and at each work station, performing a corresponding work step on the gas turbine and/or modules and/or subassemblies and/or individual parts:

wherein the at least two work steps includes a plurality of main work steps and a plurality of secondary work steps associated with at least one of the main work steps, and wherein the step of performing includes performing the secondary work steps associated with a main work step downstream from the associated main work step for disassembly step a), and upstream from the associated main work step for assembly step c); and wherein, in step c) step of assembling the gas turbine is divided into four main work steps, and wherein the gas turbine is moved consecutively through the four main work stations and assembled from modules, wherein step c) further comprises:

C1) positioning an inspected and/or repaired fan case module in a first main work step at a first main work station;

C2) moving the inspected and/or repaired fan case module to a second main work station;

C3) assembling an inspected and/or repaired high-pressure compressor module onto the fan case module in a second main work step at the second main work station, C4) moving the assembled module of step C3) to a third main work station;

C5) assembling an inspected and/or repaired low-pressure turbine module and a high-pressure turbine module onto the assembled module of step C4) in a third main work step at the third main work station, C6) moving the assembled module of step C5) to a fourth main work station;

C7) assembling an inspected and/or repaired main fan wheel module onto the assembled module of step C6) at the fourth main work station to form an assembled aircraft engine; and C8) adjusting the assembled aircraft engine as a unit.

7. A method for servicing gas turbines comprises the steps of a) disassembling a gas turbine into modules and/or subassemblies and/or individual parts of the gas turbine;

b) inspecting and/or repairing and/or replacing the modules and/or subassemblies and/or individual parts of the gas turbine;

c) reassembling the gas turbine from the inspected and/or repaired and/or new modules and/or subassemblies;

wherein at least one of steps a) and c) is divided into at least two work steps, wherein a work station is provided for performing each work step, and wherein at least one of steps a) and c) further comprise moving the gas turbine and/or modules and/or subassemblies and/or individual parts thereof through the work stations; and at each work station, performing a corresponding work step on the gas turbine and/or modules and/or subassemblies and/or individual parts;

wherein the at least two work steps includes a plurality of main work steps and a plurality of secondary work steps associated with at least one of the main work steps, and wherein the step of performing includes performing the secondary work steps associated with a main work step downstream from the associated main work step for disassembly step a), and upstream from the associated main work step for assembly step c); and wherein, in step c) step of assembling the gas turbine is divided into four main work steps, and wherein the gas turbine is moved consecutively through the four main work stations and assembled from modules and, further comprising performing a plurality of secondary work steps before each main assembly work step, wherein the fan case module and/or the high-pressure compressor module and/or the low-pressure turbine module and/or the high-pressure turbine module is assembled from inspected and/or repaired and/or new subassemblies and/or individual parts in the secondary work steps.

* * * * *